(12) United States Patent
Stawikowski et al.

(10) Patent No.: US 11,157,434 B2
(45) Date of Patent: Oct. 26, 2021

(54) SERVICE DEPLOYMENT IN A CLUSTER OF I/O DEVICES

(71) Applicant: Schneider Electric Industries SAS, Rueil Malmaison (FR)

(72) Inventors: Jean-Marie Stawikowski, Le Cannet (FR); Kévin Barbier, La Colle-sur-Loup (FR); José Petit, Villeneuve-Loubet (FR); Antonio Chauvet, Juan-les-Pins (FR); Matthieu Colasante, Cagnes-sur-Mer (FR); Didier Ferry, Le Broc (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 0 days.

(21) Appl. No.: 16/838,336

(22) Filed: Apr. 2, 2020

(65) Prior Publication Data
US 2020/0320034 A1 Oct. 8, 2020

(30) Foreign Application Priority Data

Apr. 8, 2019 (EP) .................................... 19305454

(51) Int. Cl.
| | |
|---|---|
| *G06F 13/40* | (2006.01) |
| *H04L 29/06* | (2006.01) |
| *G06F 8/60* | (2018.01) |
| *G06F 8/61* | (2018.01) |
| *G06F 9/50* | (2006.01) |
| *G06F 9/455* | (2018.01) |

(52) U.S. Cl.
CPC ............ *G06F 13/4068* (2013.01); *G06F 8/60* (2013.01); *G06F 8/63* (2013.01); *G06F 9/45558* (2013.01); *G06F 9/5044* (2013.01); *H04L 63/0209* (2013.01); *G06F 9/5077* (2013.01); *G06F 2009/4557* (2013.01)

(58) Field of Classification Search
CPC .. G06F 9/5044; G06F 9/45558; G06F 9/5077; G06F 2009/4557; G06F 8/60; G06F 8/63; G06F 13/4068; H04L 63/0209
See application file for complete search history.

(56) References Cited

U.S. PATENT DOCUMENTS

2018/0322437 A1* 11/2018 McClory .................. G06F 8/41
2019/0004779 A1 1/2019 Schmidt et al.
2020/0183726 A1* 6/2020 Heindl .................. H04L 63/102

(Continued)

OTHER PUBLICATIONS

Extended European Search Report for EP Application No. 19305454.1 dated Oct. 21, 2019, 16 pages.

(Continued)

*Primary Examiner* — Glenn A. Auve
(74) *Attorney, Agent, or Firm* — Locke Lord LLP; Peter N. Fill; Judy R. Naamat

(57) ABSTRACT

A method for deploying a service in a cluster of Input/Output devices comprising several I/O devices comprising a container engine. The method can be performed via a container client. A stack file is obtained that identifies at least one service and specifies at least one device constraint. Then, a command is sent based on the stack file, to deploy a service on a container stack of at least one first I/O device among the IO devices of the cluster if the at least one first I/O device matches the device constraint.

13 Claims, 4 Drawing Sheets

(56) References Cited

U.S. PATENT DOCUMENTS

2021/0067408 A1\* 3/2021 Vaidya .................... H04L 67/10

OTHER PUBLICATIONS

Um, C. et al., "Virtualized OneM2M System Architecture in Smart Factory Environments", 2018, 28th International Telecommunication Network Applications Conference, 6 pages.

Jo, H. et al., "Light-Weight Service Lifecycle Management for Edge Devices in I-IoT Domain", ICTC 2018, pp. 1380-1382.

Goldsciamidt, T. et al., "Container-based architecture for Flexible Industrial Control Applications", Journal of Systems Architecture, vol. 84, pp. 28-36, 2018.

\* cited by examiner

SERVICE DEPLOYMENT IN A CLUSTER OF I/O DEVICES

BACKGROUND

The present invention relates to deployment of services in devices, in particular while not exclusively, in industrial Input/Output, I/O, devices.

I/O devices are computing entities having Input/Output being sensors/actuators.

For example, an input device may comprise a sensor, which is a unit/module transforming events or changes on the environment or real physical data, into digital information. An input device may encompass any device comprising computing capabilities for acquiring, copying, transforming, managing or mixing the digital information.

An output device may comprise an actuator, which is a unit/module transforming digital information into any action/change or real physical data. An output device may encompass any device comprising computing capabilities for mixing, managing, transforming, copying or applying/implementing the digital information.

Therefore, an I/O device encompasses any device involved in both the above mechanisms and including data computing capabilities.

Services that are to be deployed in I/O devices may encompass configuration data, tuning data, calibration procedure, applicative programs, runtimes and/or firmware.

Machines and plants that are based on industrial automation systems are generally using such I/O devices. Implementing I/O devices in a plant or machine requires defining a set of information such as configuration data, tuning data, calibration procedure, applicative programs, runtimes and/or firmware. The I/O devices may be deployed in different places or may have mirrored parts in the cloud.

According to prior art methods, deployment of I/O devices consists in separating all the information/services in different software, file systems or applications, and in individually deploying this information.

Because of this, updating of the I/O devices can be long and cumbersome, especially when I/O devices are split in different places or have compatibility pain points.

There is therefore a need to facilitate deployment of services in industrial I/O devices.

SUMMARY OF INVENTION

It is an object of the invention to alleviate at least some of the disadvantages mentioned above. A first aspect of the invention concerns a method for deploying a service in a cluster of Input/Output devices comprising several I/O devices comprising a container engine. The method comprising the following operations performed via a container client:
  obtaining a stack file, wherein the stack file identifies at least one service and specifies at least one device constraint;
  sending a command based on the stack file, to deploy a service on a container stack of at least one first I/O device among the 10 devices of the cluster if the at least one first I/O device matches the device constraint.

Therefore, the invention takes advantage of the container technology, originally dedicated to IT systems, to deploy services in I/O devices in an industrial system.

According to some embodiments, the method further comprises the following operations:
  receiving the command by the container engines of the I/O devices of the cluster, and
  upon reception of the command, the container engine of the at least one first I/O device retrieves at least one image of the service from at least one registry to deploy an image of the service in a container of the container stack.

According to some embodiments, the container engine may be a Docker engine, the container client may be a Docker client, and the method may further comprise, prior to selecting the service, the following operations:
  creating a Docker swarm by designating at least one manager;
  receiving, by the at least one manager and from the container engines of several I/O devices respective requests to join the cluster.

The command to deploy may be sent to the at least one manager then forwarded by the manager to the container engines of the I/O devices of the cluster.

A Docker swarm mode may enable to control a plurality of I/O devices, which may eventually be located on different industrial sites.

In complement, the manager may be a network entity separated from the I/O devices by respective firewalls.

Alternatively or in complement, an identifier may be attributed by the manager or via the container client to each of the several I/O devices from which a request is received, and the at least one first I/O device has a unique identifier matching the device constraint.

It is therefore possible to differentiate the services that are deployed based on device identifiers, device types or other types of constraints.

According to some embodiments, the device constraint is a first device type, and the service may be deployed on the container engine of the at least one first I/O device, if the first I/O device matches the first device type.

This allows deployment of a service in several I/O devices that have the same type (for example, in all the pumps of an industrial system/site).

According to some embodiments, the service is one or several among:
  part of an automation application;
  a runtime;
  a firmware;
  configuration data;
  tuning data; and/or
  a calibration procedure.

According to some embodiments, the command further comprises environment data, and the service deployed on the container engine of the at least one first I/O device may be configured based on the environment data.

In complement, the environment data may define publish/subscribe mechanisms between several services deployed via the stack file.

In complement, the publish/subscribe mechanisms may be according to the MQTT protocol and one of the services deployed in the container stack of one of the first I/O device may be a MQTT broker service.

A second aspect of the invention concerns a computer program executable by a processor and comprising instructions for, when executed by the processor, carrying out the steps of a method according to the first aspect of the invention.

A third aspect of the invention concerns a container client device comprising:
- a user interface configured for receiving user inputs;
- a processor and a memory configured for executing a container client and for, based on the user inputs, obtaining a stack file identifying at least one service and specifying at least one device constraint;
- wherein the processor is further configured to generate a command based on the stack file and wherein the container client further comprises a network interface configured for sending the command to deploy the service on a container stack of at least one first I/O device among a cluster of I/O devices comprising respective container engines, if the at least one first I/O device matches the device constraint.

A fourth aspect of the invention concerns a system comprising a container client according the third aspect of the invention and comprising a cluster of I/O devices, wherein each I/O device comprises an actuator or sensor, an operating system and a container stack.

Further objects, aspects, effects and details of the invention are described in the following detailed description of number of exemplary embodiments, with reference to the drawings.

BRIEF DESCRIPTION OF DRAWINGS

By way of example only, the embodiments of the present disclosure will be described with reference to the accompanying drawing, wherein.

DETAILED DESCRIPTION

Figure 1:
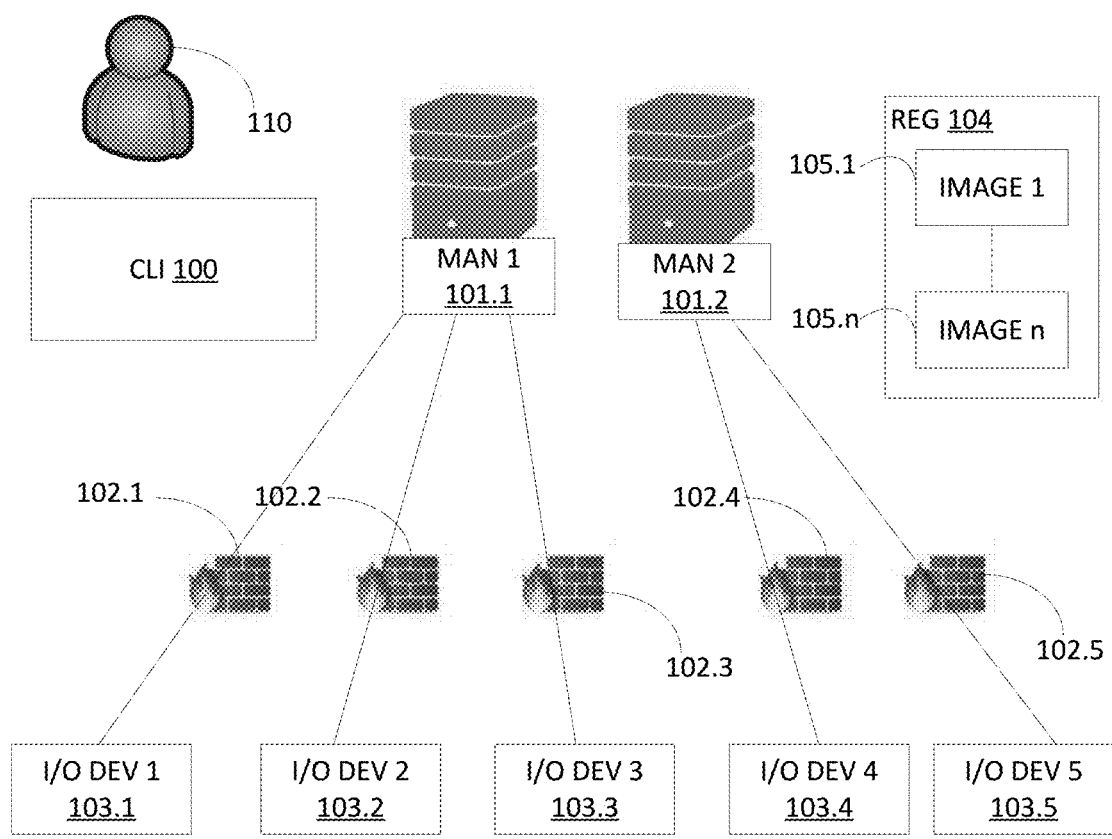
FIG. 1 illustrates a system according to some embodiments of the invention.

Referring to FIG. 1, there is shown a system according to some embodiments of the invention.

The system comprises a container client 100, which may be accessible by a user 110, for example via a Graphical User Interface, GUI or a Textual User Interface, TUI. Alternatively, the container client may alternatively be accessible by an automated system such as a SAP (Systems, Applications and Products for data processing), a system implementing a "production recipe", a maintenance management system, a "devops" system, or by a Programmable Logic Controller, PLC. In what follows, the example of a container client 100 being accessible by a user via a TUI is considered, for illustrative purposes only.

A container is a runnable instance of an image of a service that contains the environment necessary for the service to be run. A service may be deployed in at least one container in one I/O device, but may also involve creating several containers in different I/O devices.

For example, in a distributed application, different pieces of the application may be called services. The different pieces (services) may be deployed in a stack as explained hereafter.

Any type of service may be deployed using containers, such as applications/runtimes/firmware (allowed by the current container technology such as Docker) but also configuration data, tuning data and calibration procedures, which can also be developed in an isolated environment to be containerized and deployed in I/O devices.

The container client 100 can be executed on a device comprising computing capabilities, such as a desktop computer, a laptop, a Smartphone, etc, and enables to communicate with a server, such as a daemon in the Docker technology.

The container client 100 allows the user to select or to create a deployment file as it will be further described. The deployment file may be in the YAML format. As a first alternative, the deployment file can be in the JSON format. However, the deployment file is not restricted to these two formats and may be under any other format that is compatible with the container technology. In particular, it can be generalized to any format representing data preferably in a structured manner, which is common to all or most of the entities shown on FIG. 1, or which is interoperable (which can be translated in another format used by the other entities of the system).

In what follows, the example of Docker is considered, for illustrative purposes. However, the invention is applicable to any container technology, not only Docker.

Docker enables to automate the deployment of services/applications as portable, self-sufficient containers that can run on the cloud or on-premises.

A container corresponding to a service can be created via a Dockerfile, which defines what goes on in the environment inside the container. Access to resources like networking interfaces and disk drives is virtualized inside this environment, which is isolated from the rest of the system hosting the container. Then, based on the Dockerfile, an image of the service is built and can be stored in a local or remote registry 104, to be subsequently deployed in I/O devices as a containerized service.

A registry may be public or private. For example, by default, an image may be stored in a public registry, such as Docker public registry for example. A registry may be seen as a collection of repositories, which are collections of images.

The system further comprises at least one manager, for example two managers 101.1 and 101.2, in particular for implementing a Docker swarm mode, according to some embodiments of the invention. Swarm mode is a Docker feature that provides built-in container orchestration possibilities. Docker swarm allows to deploy a service onto a cluster of several nodes, running it on multiple machines (I/O devices according to the invention). This cluster is called a swarm.

Figure 3:
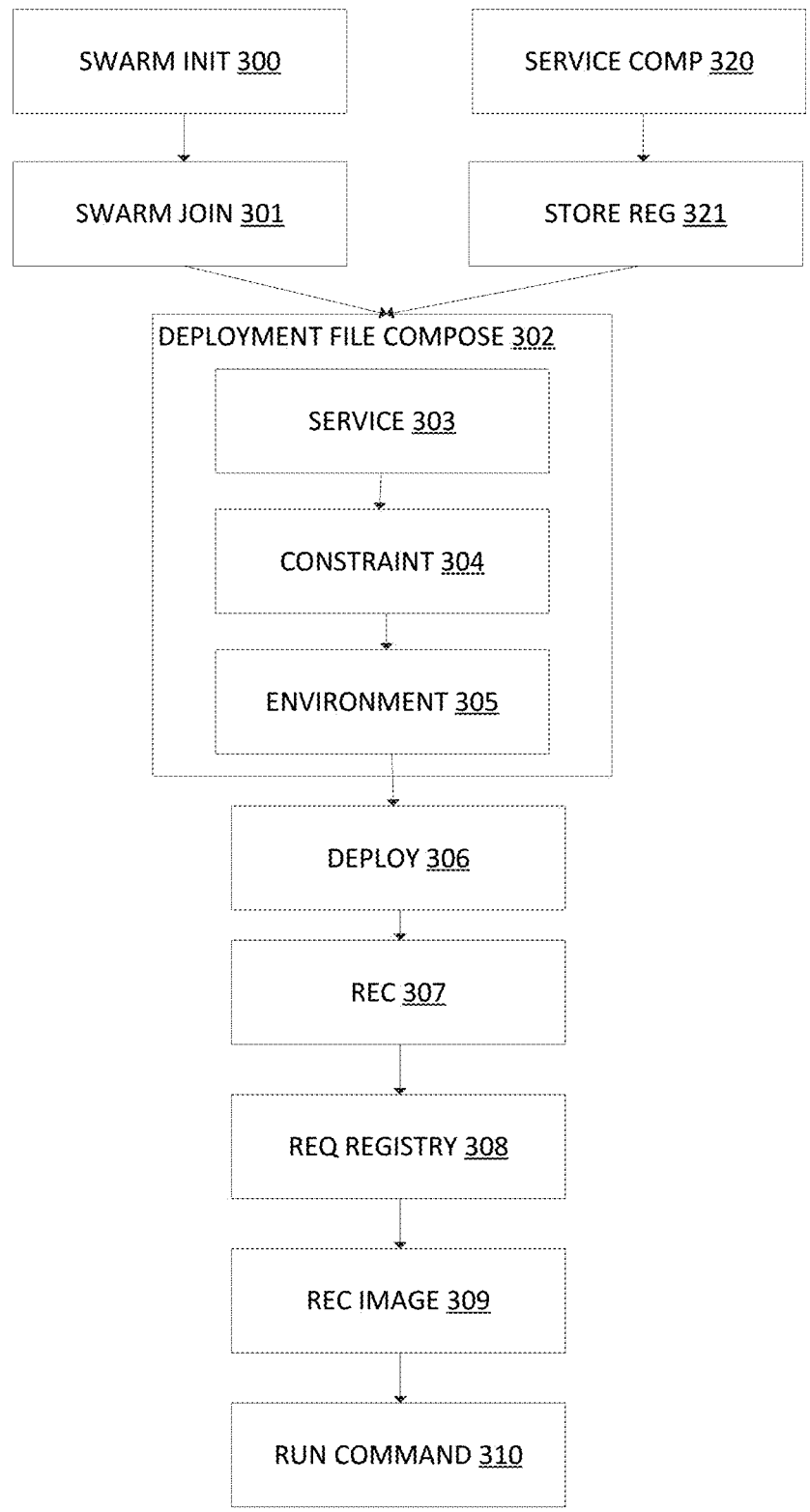
FIG. 3 is a flowchart illustrating the steps of a method according to some embodiments of the invention.

A swarm is therefore a group of machines that are running a Docker daemon and which are joined as several nodes into a cluster in a configuration phase, as it will be better understood referring to FIG. 3.

The system of FIG. 1 further comprises several I/O devices, which may be grouped in a cluster/swarm, such as five I/O devices 103.1, 103.2, 103.3, 103.4 and 103.5. The I/O devices 103.1, 103.2 and 103.3 are managed by the manager 101.1 and the I/O devices 103.4 and 103.5 are managed by the manager 101.2. However, no restriction is attached to:
- the number of managers 101;
- the number of I/O devices 103;
- the number of I/O devices 101 per manager 103.

Docker Swarm provides native clustering functionality for Docker containers, which turns a group of Docker engines (such as the ones installed on the I/O devices 103) into a single virtual Docker engine. According to Docker swarm, the Docker engines on the I/O devices 103.1 to 103.5 may be designated as "workers", in contrast to the managers 101.1 and 101.2.

Swarm managers are the only nodes of a swarm that can execute commands from the client 100, or can authorize other I/O devices to join the swarm.

The system may further comprise respective firewalls 102.1 to 102.5 for each of the I/O devices 103.1 to 103.5.

The I/O devices may communicate with the client 100 and the managers 101.1 and 101.2 via a network, such as a local network or an extended network (IP network for example).

The system according to some embodiments of the invention may further comprise a registry, also accessible via the network, and which stores several images 105.1-105.*n*, such as Docker images, corresponding to respective services. These images may have been obtained based on Dockerfiles. The name of the image can be used to identify the service, when requesting it.

The client may enable the user to deploy services in some of the I/O devices. This may involve the use of a stack file as it will be further described hereafter. The stack file is made to request some I/O devices to retrieve images from the register so as to store them in respective containers.

Figure 2:
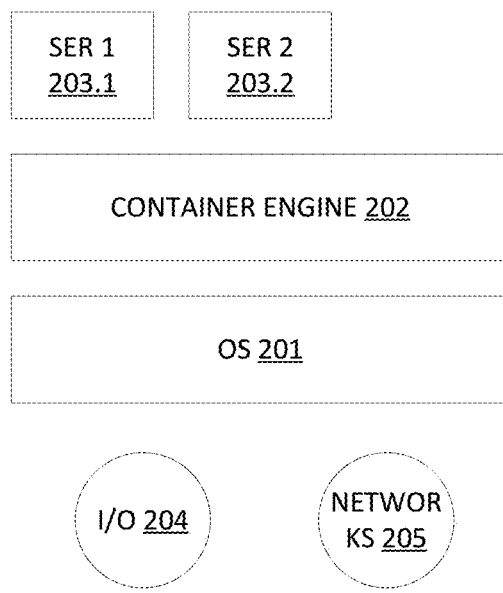
FIG. 2 illustrates a software/hardware structure of an I/O device according to some embodiments of the invention.

Referring to FIG. 2, there is shown the software/hardware arrangement of the I/O devices 103 according to some embodiments of the invention.

The container engine 202, such as a Docker engine, is installed over an operating system 201 without the need to have an intermediate virtual machine. The OS 201 can access to the input/output interfaces 204 of the I/O device 103 and to the network interface(s) of the I/O device allowing the I/O device container engine to communicate with external entities such as the Swarm manager 101.1-101.2. It also allows more generally to connect the I/O device with all external entities, in particular when deployed services are implemented and that these services involve communications between different containers, possibly stored on different I/O engines. As explained hereafter, the services may imply publish/subscribe mechanisms that lead containerized services on different I/O devices to communicate together via their respective network interfaces.

The OS 201 may for example be Linux™. However, no restriction is attached to the OS, which may be any existing or future operating system that allows use of container technologies.

Several containers 203.1-203.2 corresponding to respective services may be deployed on the container engine 202.

According to the present invention, a "service" or "microservice" refers to services of small size and independent on each other. A service can be part of an application, such as an automation application, or a runtime, or can be any other type of data that has been already described. Examples of applications or corresponding runtimes can be:

IEC 61131-3;
IEC 614499;
Node-RED;
MQTT broker;
Other services.

Each service has a distinct computer code, which can be developed by a development team, independently from other services. As explained before, the computer code can be composed in a Dockerfile. The team can update an existing service without needing to recreate and redeploy a whole application. The Dockerfile is updated and the images stored in the registries are updated based on the new version of the Dockerfile. An updated image can then be deployed in the containers of the I/O devices using a command of the type "docker stack deploy" in association with a deployment file, of the YAML format for example.

Communication between containerized services can be performed using dedicated Application Programming Interfaces, APIs. Details regarding internal organization of each service are not shown to the other services. The services do not need to share common technology stacks, libraries or frameworks.

Therefore, deployment of services/microservices according to the invention provides the following advantages:
 independent deployments;
 independent developments;
 specialized development teams: development teams can focus on a single service;
 isolated errors. If a service breaks down, it does not impact the other services; and
 technology stacks can be mixed.

Referring to FIG. 3, there is shown a method according to some embodiments of the invention.

At step 300, a Swarm network is initiated by designating at least one Docker swarm manager 101.1 or 101.2 via the client 100. This may involve creating a network key and this step can be performed using the "docker swarm init" command via the container client 100.

At step 301, at least one I/O device 103 joins the initiated Swarm network by sending a request to join the network to the Docker Swarm manager 101.1 or 101.2. This could be performed via a "docker swarm join" command, involving returning the network key to the Docker Swarm manager 101.1 or 101.2. The request (or "docker swarm join" command) sent by an I/O device may be generated based on an operator input accessing to the I/O device. To this end, the operator may input an identifier of the docker swarm manager 101.1 or 101.2 and the network key via an interface of the I/O device for example.

During step 301, each of the I/O devices 103 which join the swarm network may be identified by a unique network identifier. "Unique network identifier" means that the identifier uniquely identifies the I/O device 103 hosting the worker node/container engine in the swarm network, or uniquely identify one or several of the port numbers of the I/O device through which the worker node is accessible. The unique network identifier may be for example the IP address of the I/O device 103 (and in complement a port number or a series of port numbers).

The user 110 may additionally define a device identifier that can be mapped to the unique network identifier, and which may facilitate further identification of the I/O device by the user 110. The user 110 may also define a type of the I/O device.

This can be achieved by defining labels during a configuration phase that is performed after steps 300 and 301 and before step 302. For example, the user 110 may use the client 100 to define labels such as "Node.labels.type" defining a type of I/O device, or "Node.labels.name" defining a device identifier of I/O device, which is preferably different from the network identifier. The device identifier may be of the form "descriptor+number" such as "module01", "module02", "pump1", "valve3", etc, for example. The type label may be a type name such as "Pump", "Valve", "PLC", etc. Other complementary identifiers may also be defined for each node hosted on a I/O device.

The "docker swarm init" command may contain a preconfigured docker swarm join command to add I/O devices to the cluster, so that steps 301 and 302 can be performed using a single command.

It is to be noted that steps 300 and 301 are described in the context of Docker swarm, and that, therefore, they are optional, in particular if another container technology is used for implementing the invention.

In parallel, and preferably before steps 300 and 301, the method may comprise a step of developing a service, such as a service computer code, using Docker file for example, as previously explained. An image of the service is then obtained and can be stored in a public or private registry at step 321.

At subsequent step 302, the user may use the container client 100, such as the Docker client 100, to generate a command to deploy a service using a container stack in one or several of the I/O devices 103.1 to 103.5. The command may be based on a deployment file (or stack file) and the deployment can be performed using the "docker stack deploy" command. A stack may comprise one service or a set of several services that may be dependent or independent on each other. For example, a stack may be a set of interrelated services that share dependencies and can be orchestrated together. A single stack may be capable of defining and coordinating the functionality of an entire application, although very complex applications may use multiple stacks. A complete stack can be deployed using only one deployment file according to the invention.

Step 302 may comprise several sub-steps to obtain and deploy the stack file. The user may start step 302 by composing a new stack file, using Docker compose for example, selecting an existing stack file or modifying an existing stack file stored in a local or remote storage.

The service may be already identified in the stack file or may be inputted by the user. The service is identified using a name/identifier, which enables to retrieve an image of the service in the registry 104. As mentioned above, the identifier identifying the service may be the name of one of the images 105 in the registry 104. In complement, the identifier identifying the service may identify a version of the image or may indicate that the latest version is to be deployed.

At sub-step 304, the user may specify at least one device constraint. The device constraint can then be used by the I/O devices 103 to identify whether they are concerned by the service deployment or not. No restriction is attached to the device constraint. For example, the device constraint may be based on the device labels identified above, such as a type of I/O device ("pump" for example), or may alternatively be the device identifier of a I/O device 103 as mentioned above.

At sub-step 305, the user may define at least one environment data item. "Environment data" designates any data related to:
- the data acquired/received/transmitted by an I/O device. If the I/O device 103 is a pump, this data may correspond to a speed value, a flow value, a power value and/or a pressure value measured by the I/O device 103. Also, environment data can identify several publication channels corresponding to different types of data acquired/sensed by the I/O device. This may be used when containerized services on different I/O devices are connected by publish/subscribe mechanisms for example. Subscriptions and publications may be defined by data describing tasks, task names and/or task slots of the I/O device on which the containerized service is deployed;
- to data identifying a node, a node identifier, a node hostname (such as the IP address of the I/O machine hosting the node);
- to data identifying a service, a service identifier, a service name, a service label; or compatibility rules with other services deployed on other containers of the same I/O device or of other I/O devices.

Some of the environment data may be injected by the docker swarm manager 101.1-101.2, without the need for the user to add it in the stack file. For example, if the user specifies a device identifier (such as "pump2") as a constraint, the environment data may comprise the node identifier corresponding to "pump2", and may be injected by the docker swarm manager 101.1-101.2 which may store (after the configuration phase) the correspondence between device identifiers and node identifiers such as unique network identifiers.

The environment data may also define publish/subscribe mechanisms between several I/O devices 103 of the cluster. The publish/subscribe mechanisms may be according to the MQTT protocol. In that context, a service identified in the stack file and intended to be deployed in the container stack can be a MQ Telemetry Transport, MQTT, broker service. Other containerized services of the stack file may be communicating the MQTT broker service via publish/subscribe mechanisms.

More generally, the stack file may identify several services to be deployed in containers on one or several I/O devices and may define communication mechanisms between these services.

For example, a first service identified in the stack file may be a MQTT broker service to be deployed in a first container of I/O device 103.1. A second service of the stack file may be a service to publish data sensed by the I/O device 103.2, to the MQTT broker service containerized in the first container of I/O device 103.1. To this end, the environment data of the second service may identify data to be published as a task and may specify the identifier (network address or device identifier) of the I/O device 103.1 comprising the first container.

More generally, the stack file enables to specify publish/subscribe mechanisms between different services to be deployed in the swarm. Different services can be deployed in different containers of a same I/O device 103, each container being associated with a different port number of the I/O device.

As mentioned above, the service name, device constraint and environment data may be predefined in a stack file, may be input by the user in the stack file, or may be modified by the user in a pre-existing stack file or may be already present in a pre-existing stack file.

An example of Yaml stack file is given hereafter:

```
services:
  service1:
    image: registre1/pump:latest
    hostname: Pump1
    deploy:
      mode: global
      placement:
        constraints:
          - node.labels.Type == Pump
          - node.labels.Name == module01
      environment:
        - DEVICE_NODE_ID = {{.Node.ID}}
        - DEVICE_NODE_HOSTNAME = {{.Node.Hostname}}
  service2:
    image: registre2/pump:latest
    hostname: Pump2
    deploy:
      mode: global
      placement:
        constraints:
```

-continued

```
        - node.labels.Type == Pump
        - node.labels.Name == module02
    environment:
        - DEVICE_NODE_ID = {{.Node.ID}}
        - DEVICE_NODE_HOSTNAME = {{.Node.Hostname}}
```

This stack file targets the deployment of two services (service "pump:latest" of registry1 and service "pump:latest" of registry 2) in two containers in two different I/O devices (module01 on I/O device 103.1 and module02 on I/O device 103.2). Therefore, although only one register 104 is shown on FIG. 1, the system according to the invention may comprise several registers storing respective images. It is to be noted that, according the invention, several services may be deployed in only one I/O device or in several I/O devices.

According to the example above, the first service is deployed in the I/O device 103.1 that hosts the container engine identified by "module01" because the constraint "node.labels.Type==Pump; node.labels.Name==module01" is specified in the stack file. Similarly, the second service is deployed in the I/O device 103.2 that hosts the container engine identified by "module02" because the constraint "node.labels.Type==Pump; node.labels.Name==module02" is specified in the stack file.

In that example, both I/O devices 103.1 and 103.2 are pumps. Considering that I/O device 103.3 is of another type, for example a valve, a service can be deployed in I/O devices 103.1 and 103.2 (but not I/O device 103.3) by specifying "node.labels.Type==Pump" as constraint (without specifying any device identifier "node.labels.name").

Alternatively, a service may be deployed in all the I/O devices of the cluster/swarm by not specifying any constraint associated with the service to be deployed.

Once the stack file has been selected/composed/modified by the user, the user may generate a command via the client 100 to deploy at least one container stack comprising one of the identified services, at step 306. It is to be noted that, as shown in the example above, no restriction is attached to the number of container stacks (corresponding to the number of services), which are deployed using one stack file. The command may be based on the "docker stack deploy" command of Docker, which can be:

docker stack deploy -c File.yaml where File.yaml corresponds to the stack file composed/selected/modified at step 302.

In what follows, we consider, for illustrative purposes only, the deployment of a container stack corresponding to a first service, associated with image 105.*i* in the registry 104 (i being an integer comprised between 1 and n), and to be deployed in the I/O devices 103.2 and 103.4.

At step 307, the client 100, via the managers 101.1 and 101.2, sends at least one command/request based on the stack file to the I/O devices 103.1-103.5 and the command/request is received by all the I/O devices 103.1-103.5 of the cluster (the network nodes). Several commands/requests may be generated and sent based on a single stack file. The command/request comprises the service identifiers, constraints and environment data of the stack file or triggers the I/O device 103.1-103.5 to access to these data in the manager. Each of the I/O devices 103.1-103.5 comprises a Docker engine as shown on FIG. 2 that is configured for reading the command and determining whether the I/O device matches a device constraint of one of the services described in the command. For example, if the only device constraint is "node.labels.Type==Pump" and if the I/O device 103 is not a pump, it disregards the stack file. On the contrary, if the I/O device 103 matches the device constraint(s) of a service of the stack file, the container engine of I/O device 103 sends a request to the registry 104 at step 308, the request identifying an image 105.*i* corresponding to the service for which the I/O device 103 matches the device constraint.

In the example considered here, the container engines of the I/O devices 103.2 and 103.4 therefore send a request to the registry, identifying image 105.*i*.

At step 309, the container engines of the I/O devices 103.2 and 103.4 retrieve the image 105.*i* from the registry 104. The image 105.*i* is then containerized on the I/O device 103.

At a subsequent step 310, the user enters a run command via the client 100, which is forwarded to the Docker daemon on the device 103.2 to execute the container comprising image 105.*i* for example. The run command comprises an identifier of the service associated with the image 105.*i* and of the I/O device 103.2.

The container comprising image 105.*i* is then executed/run on the I/O device 103.2. If environment data had been described at step 305, then the container may be executed based on the environment data.

It is to be noted that the stack file may target to deploy several services in several I/O devices or in a single device I/O. In that case, the steps 308 to 310 above are indifferently performed for each service.

Figure 4:
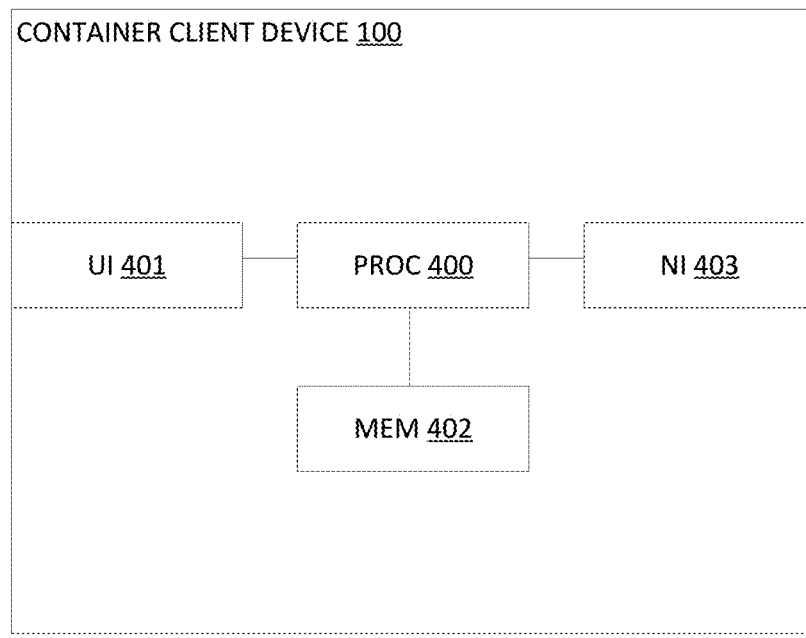
FIG. 4 illustrates a structure of a container client device according to some embodiments of the invention.

FIG. 4 illustrates the structure of a device executing the container client 100, or container client device, according to some embodiments of the invention. As explained above, the container client device may be a desktop computer, a laptop, a Smartphone, or any device comprising the following structure.

The device comprises:
  a user interface 401 configured for receiving user inputs. No restriction is attached to the user interface, which may be any combination of a keyboard, a touchpad, a computer mouse, etc;
  a processor 400 and a memory 402 configured for executing the container client and for, based on the user inputs, obtaining the stack file identifying at least one service and specifying at least one device constraint (and optionally environment data). The memory 402 may be a Random Access Memory, RAM, a flash memory, a Read Only Memory ROM and/or any other type of memory; The processor is further configured to generate a command based on the stack file;
  a network interface configured for sending the command to the managers 101.1 and 101.2 in swarm mode, or to the container engines of the I/O devices 103. No restriction is attached to the network interface, which may be any interface allowing to connect to a local or extended network such as an IP network for example.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for deploying a service in a cluster of Input/Output (I/O) devices, I/O devices of the cluster comprising respective container engines, the method comprising the following operations performed via a container client:
   obtaining a stack file, wherein the stack file identifies at least one service and specifies at least one device constraint, wherein the device constraint specifies a characteristic of two or more I/O devices of the cluster; and
   sending a command based on the stack file, to the cluster to deploy a service on a container engine of I/O devices of the cluster that match the at least one device constraint, wherein the command is configured to be disregarded by all I/O devices of the cluster that do not match the at least one device constraint.

2. The method according to claim 1, further comprising:
   receiving the command by the container engine of the I/O devices of the cluster, and
   upon reception of the command, the container engine of the at least one first I/O device retrieves at least one image of the service from at least one registry to deploy an image of the service in a container of the container stack.

3. The method according to claim 1, wherein the container engines of the respective I/O devices of the cluster are a Docker engines, wherein the container client is a Docker client, and wherein the method further comprises, prior to sending the command, the following operations:
   creating a Docker swarm by designating at least one manager; and
   receiving, by the at least one manager and from the container engines of the I/O devices of the cluster respective requests to join the cluster;
   wherein the command is sent to the at least one manager and then forwarded by the at least one manager to the container engines of the I/O devices of the cluster.

4. The method according to claim 3, wherein the at least one manager is a network entity separated from the I/O devices by respective firewalls.

5. The method according to claim 3, wherein an identifier is attributed by the at least one manager or via the container client to each of the I/O devices of the cluster from which a request is received, and wherein one of the two or more I/O devices has a unique identifier matching the device constraint.

6. The method according to claim 1, wherein the device constraint is a first device type, and wherein the two or more I/O devices have device types that match the first device type.

7. The method according to claim 1, wherein the service is one or several among:
   part of an automation application;
   a runtime;
   a firmware;
   configuration data;
   tuning data; and/or
   a calibration procedure.

8. The method according to claim 1, wherein the command further comprises environment data, the environment data being related to data acquired, received, and/or transmitted by the two or more I/O devices, and wherein the service deployed on the container engines of the two or more I/O devices are configured to operate based on the environment data.

9. The method according to claim 8, wherein the environment data defines publish/subscribe mechanisms between several services deployed via the stack file.

10. The method according to claim 9, wherein the publish/subscribe mechanisms are according to a MQTT protocol and wherein one of the services deployed in the container engine of one of the first two or more I/O devices is a MQTT broker service.

11. A computer program product comprising a non-transitory processor-readable medium having processor-readable instructions stored thereon, the processor-readable instructions, when executed by a processor, causing performance of at least a method according to claim 1.

12. A container client device comprising:
   a user interface configured for receiving user inputs; and
   a processor and a memory configured for executing a container client and for, based on the user inputs, obtaining a stack file identifying at least one service and specifying at least one device constraint, wherein the device constraint specifies a characteristic of two or more I/O devices of a cluster of I/O devices;
   wherein the processor is further configured to generate a command based on the stack file and wherein the container client device further comprises a network interface configured for sending the command to the cluster -to deploy the service on a container engine of I/O devices of the cluster that match the at least one device constraint, wherein the command is configured to be disregarded by all I/O devices of the cluster that do not match the at least one device constraint.

13. A system comprising a container client device according to claim 12, wherein each I/O device of the cluster further comprises an actuator or sensor, and an operating system.

* * * * *